United States Patent

[11] 3,581,052

[72] Inventor Rex W. Milton
 Houston, Tex.
[21] Appl. No. 834,291
[22] Filed June 18, 1969
[45] Patented May 25, 1971
[73] Assignee Bauer & Associates, Inc.
 Continuation-in-part of application Ser. No. 813,436, Apr. 4, 1969, now abandoned.

[54] SHIELDED ARC WELDING CONTROL SYSTEM
 10 Claims, 6 Drawing Figs.
[52] U.S. Cl. ................................................ 219/131,
   219/135, 219/130
[51] Int. Cl. ................................................ B23k 9/10
[50] Field of Search ..................................... 219/125,
   124, 131, 137

[56] References Cited
 UNITED STATES PATENTS
 3,233,076 2/1966 Vilkas ........................... 219/131F
 3,262,006 7/1966 Sciaky et al. .................. 219/125X
 3,264,447 8/1966 Agnew ......................... 219/131FX
 3,299,250 1/1967 Vilkas et al. .................. 219/124X 3,370,151 2/1968 Normando ................... 219/131
 Primary Examiner—J. V. Truhe
 Assistant Examiner—George A. Montanye
 Attorney—Fay, Sharpe and Mulholland ABSTRACT: A feedback control system responsive to the ion density in the arc envelope of a welding electrode. The sensing end of a potential gradient probe is positioned in the arc envelope, and a signal is developed in the probe that is proportional to the position of the arc with respect to the workpiece. The induced signal is transmitted to a signal amplifier which responds to signal deviations from a reference signal position of the probe. The output signal from the amplifier controls the degree of field excitation applied to an electrical-welding generator field winding from an exciting source. The amplifier output signal may also be used to control the rate of welding electrode feed as well as the rate of welding head travel. The variable output voltage of the welding generator is connected between the welding electrode and the workpiece to directly control the position of the arc. In this way the output voltage of the welding generator is responsive to the potential gradient of the arc and correctly positions the arc for depositing weld metal on the workpiece.

PATENTED MAY 25 1971 3,581,052

INVENTOR.
REX W. MILTON, SR.
BY
Fay, Sharpe & Mulholland
ATTORNEYS

SHIELDED ARC WELDING CONTROL SYSTEM

BACKGROUND OF THE INVENTION

This application is a continuation-in-part of U.S. Letters Patent Application Ser. No. 813,436, filed Apr. 4, 1969 now abandoned.

This invention broadly relates to automatic arc-welding systems, and more particularly to a shielded arc-welding feedback control system responsive to the potential gradient surrounding the arc envelope, to control the position of the arc with respect to the workpiece.

The presently used automatic control systems for arc welders provide a degree of arc positioning control by sensing conditions remote from the arc and using signals obtained therefrom to control the welding generator power output. The inherent drawback of these systems is that they are not responsive to the arc itself and thus are responsive after the arc has already had an effect on the workpiece. The major problems associated with this type of system response are that the arc may burn through the workpiece or the weld metal may be deposited improperly before the system can correct the position of the arc with respect to the workpiece.

PRIOR ART

Among the prior art automatic control systems for arc welders is a patent to E. P. Vilkas et al., U.S. Pat. No. 3,299,250, entitled "Welding System." This patent provides a control system which responds to the molten metal at the weld itself to control the weld penetration. The system is responsive to the infrared radiation from the molten metal at the weld. The infrared radiation from the molten metal is sensed by a device having a photocell and a collimator for directing the infrared radiation from the weld onto the photocell.

The arrangement of the sensing device in the Vilkas et al. patent is specifically designed to preclude the light of the arc itself from being directed on the photocell or other sensing device. From this teaching, it is clear that the automatic control system is responsive to the weld penetration in the workpiece after the arc has done its work at a particular spot on the workpiece.

Although the Vilkas et al. automatic-welding system senses conditions near the arc and uses signals obtained therefrom to control the welding generator output, the penetration of the arc at a point on the workpiece may be at an improper depth before the system can correct itself. It is only after the arc has moved to a subsequent point that the sensing device of Vilkas et al. can respond to the improper penetration at the first point to correct the system. Uniform weld penetration along a long welded seam is very often an ideal result, and the Vilkas et al. device does not attain this result since the conditions of the weld joint may vary from point to point. The variable conditions of the joint to be welded may include gapping, mismatch, variations in thickness due to tack welds, and variations in the mass adjacent to the welded joint. When any of these conditions are present at a point on the workpiece, there is a likelihood of improper depth of weld penetration at that point since the control system must wait until a defect in the weld is sensed. Moreover, correction of each of these weld defects is time consuming because it requires a second welding operation. The welded seam is less than ideal in the sense that it has flaws or weaknesses which may never be completely eliminated because of the inherent nature of the sensing device.

It is desired to provide a control system which responds to the potential gradient of the free electrons in the arc envelope. A system of this type responds to control the penetration of weld while the weld is being made at a point. The depth of penetration of the weld at any point along a weld joint is controlled more accurately than heretofore achieved. The variable conditions of the joint to be welded influence the potential gradient in the arc envelope, and the positioning of the arc and the depth of penetration of the arc are controlled by these variable conditions at the time the weld is taking place. The ultimate seam of the weld is uniformly made, and the absence of flaws and weak spots in the welded seam eliminates the need for a second welding operation.

SUMMARY OF THE INVENTION

The present invention provides a shielded arc-welding feedback control system. The depth of penetration of the arc between a welding electrode and the workpiece is controlled in response to the value of the potential gradient in the arc envelope of the welding electrode. This potential gradient is produced by the potential drop between the potential on the welding electrode and the workpiece through the ionized gas in the arc envelope. The conductivity of the ionized gas depends upon the density of free electrons or ions in the gas and this density varies with distance from the arc.

A sensing probe is positioned between the welding electrode and the workpiece to detect the potential between the probe and any other reference point. Although the present invention uses the potential between the probe and the workpiece, this feature is not intended to be limiting inasmuch as any detecting means that will detect the changes in the ion density in the ionized gas as the distance from the detecting means to the arc varies will provide a signal that may be used to control arc location. If the arc deviates from a reference location, the ion density in the ionized cloud changes thereby causing the potential at the probe to change.

A signal amplifier is connected between the workpiece and the sensing probe. The feedback signal generated in the probe by the potential gradient is amplified and used to control the degree of excitation of the field winding of the welding generator which in turn directly controls the welding generator output voltage, thereby correcting the deviation of the arc from its reference location. The amplified feedback signal may also be used to control the rate of welding electrode feed as well as the rate of welding head travel.

The welding generator output voltage directly controls the position of the arc with respect to the workpiece and consequently the depth of penetration of the arc is controlled. The feedback signal generated in the probe by the potential gradient accurately controls the position of the arc and the deposit of weld metal on the workpiece so that a uniform weld seam is applied.

The illustrated preferred embodiment of this invention also shows a gas shield surrounding the welding head having a closed skirt portion which extends to the surface of the workpiece. The gas shield is spaced from the welding head to form a nozzle for directing the gas toward the arc. In this embodiment just the sensing end of the probe is positioned within the region of the gas discharge between the gas shield and the workpiece.

In another illustrated embodiment, using the same principle as the preferred embodiment, the sensing probe is positioned between the gas shield and welding head and is separated from the gas shield and the welding head by an insulating medium.

In both of the illustrated embodiments of this invention, therefore, I provide a shielded arc-welding feedback control system responsive to the potential gradient surrounding the arc envelope to control the position of the arc with respect to the workpiece.

OBJECTS OF THE INVENTION

The principal object of the present invention is to automatically control the depth of the arc penetration into a workpiece by sensing the free electron potential gradient surrounding the arc envelope in a shield arc-welding system so that a uniform weld seam is made regardless of the variable conditions of the joint to be welded.

A further object is to increase the strength of the weld seam by eliminating burn through and by depositing the weld metal to a controlled depth in the workpiece by using a feedback signal responsive to the potential gradient of the arc itself.

Another object is to provide a universal feedback control system for arc welders using AC or DC welding generator systems.

To the accomplishment of the foregoing and related ends, the following description sets forth in detail the means of carrying out the invention. Such disclosed means is not meant to be limiting inasmuch as it constitutes but two of the various ways in which the principles of the invention may be applied.

In the drawings wherein like reference numerals indicate like parts in the various views.

DESCRIPTION OF THE PREFERRED EMBODIMENTS

Figure 1:
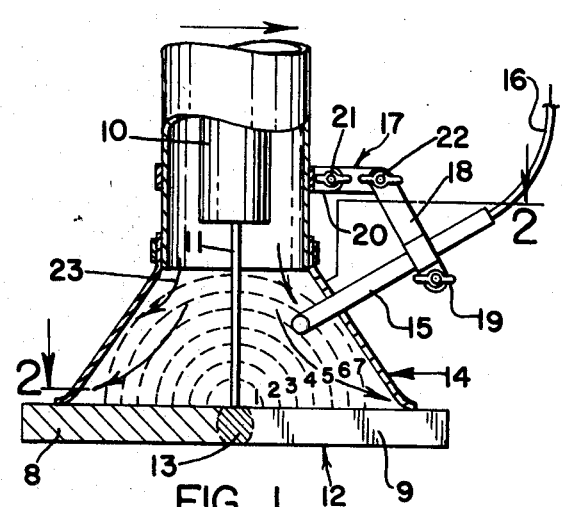
FIG. 1 is a side elevation view of the preferred embodiment, partly in section, illustrating the relationship of the potential gradient probe with respect to the welding head and the workpiece, with the welding arc properly penetrating the workpiece.

Turning to the principles of the instant invention, there is shown in FIG. 1 an assembly which utilizes the potential gradient feedback control described herein. Two pieces of metal, 8 and 9, are to be welded together and will be referred to hereinafter as the workpiece 12. A welding head 10 having a welding electrode 11 is positioned above the workpiece 12, and one end of the welding electrode 11 is placed in close proximity to the workpiece 12. A welding arc 13 caused by an electrical potential difference between welding electrode 11 and workpiece 12 is shown penetrating the interface between the pieces of metal 8 and 9 to deposit the weld metal in this space.

A gas shield 14 is positioned to encircle the welding head 10 and the welding electrode 11. The end of the gas shield 14 spaced from the workpiece 12 forms a nozzle with the welding head 10 to direct the flow of a gas 23 around the arc envelope between the electrode 11 and workpiece 12. A skirt 14a extends from gas shield 14 to the top surface of workpiece 12 to contain the gas 23 in the region of the arc 13. The skirt 14a may be asbestos or another suitable material. The use of an atmosphere, such as carbon dioxide, helium, argon, or a mixture of gases directed on a welding arc from a nozzle surrounding the welding head is well known in the art and requires no further explanation. The heat from the arc 13 and the difference of potential between the welding electrode 11 and the workpiece 12 causes the surrounding gas 23 to become ionized, creating free ions in the arc envelope.

The output voltage of a welding generator is connected between the workpiece 12 and the welding electrode 11 to create a difference in potential and to form arc 13. The potential gradient produced between the welding electrode and the workpiece in the region of the arc is caused from the varying density of free ions. The density of free ions is inversely proportional to the radial distance from the arc. The semicircular dashed lines numbered 1, 2, 3, 4, 5, 6 and 7 represent relative values of potential gradient between the welding electrode 11 and workpiece 12 respectively. The potential gradient is greatest in the region most proximate to the arc as at 1 and diminishes in tensity as the distance from the arc increases. The relative magnitude of the potential gradient lines with respect to probe 15, as shown in FIG. 1, is the reference position for the system. The reference position is chosen here because the depth of penetration of the arc 13 into the workpiece 12 is correct for depositing the weld metal between the interface of metal pieces 8 and 9.

Figure 2:
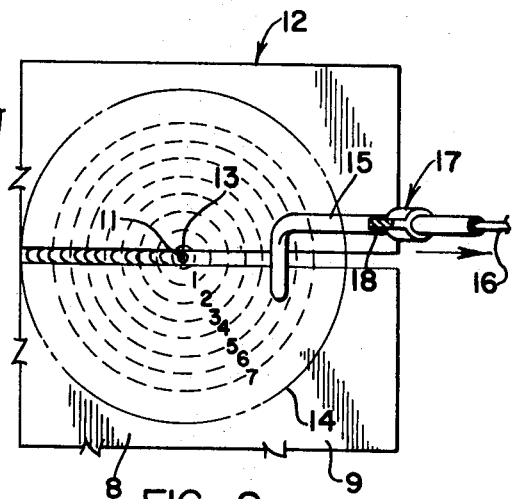
FIG. 2 is a plan view taken along 2-2 of FIG. 1 and illustrates one way of orienting the potential gradient probe with respect to the workpiece.
Figure 5:
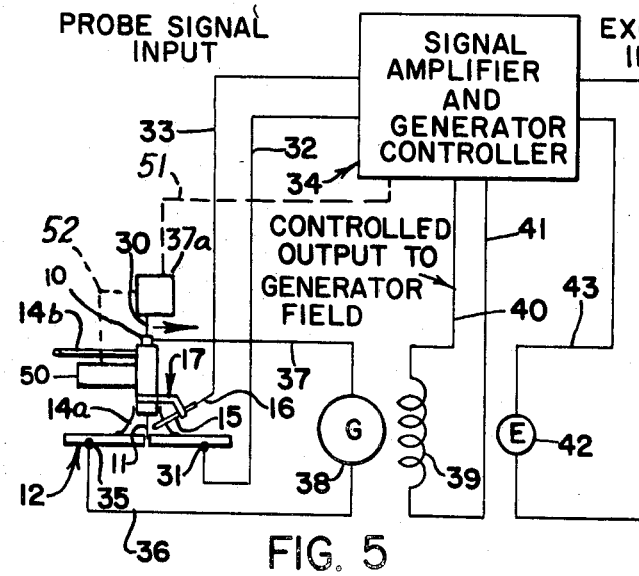
FIG. 5 is a schematic circuit diagram of the shielded arc welding feedback control system using the potential gradient probe for controlling the position of the welding arc with respect to the workpiece.

A probe 15 for measuring the potential gradient of the free ions is projected through the skirt 14a and is positioned between the gas shield 14 and the workpiece 12. The probe may be a tungsten rod of any suitable diameter, and 3/32-inch as well as 5/32-inch diameter rods have been used successfully. One end of the probe 15 is L-shaped, as seen in FIG. 2, and it is this end of probe 15 which senses the potential gradient. The L-shaped end of probe 15 is located substantially within the space between the lines 5 and 6 for the reference position of the welding arc 13 as shown in FIGS. 1 and 2. The L of the probe may also be oriented transversely relative to the interface between 8 and 9 and leading the welding electrode 11 in the direction of travel. A reference signal voltage is generated in probe 15 from the flow of free electrons which are conducted from the probe 15 through cable 16 to signal amplifier 34, as shown in FIG. 5.

The probe 15 is held in a movable fixed position relative to the gas shield 14 by a probe clamp 17. The probe clamp 17 is slidably fixed on the gas shield 14 with a strap member 20 encircling the gas shield 14. A strap locking member 21 fixes the vertical position of the strap member 20 relative to gas shield 14. One end of an arm member 18 is pivotably locked to the strap member 20 by an arm locking member 22, and this fixed the angle of probe 15 with respect to the surface of workpiece 12. The other end of the arm member 18 is slidably fixed to the probe 15 by means of the probe locking member 19. The two slide-locking members, 19 and 21, and the pivotal locking member 22, for the probe 15, provide the necessary freedom of adjustment to position the L of probe 15 in the proper relationship with respect to the potential gradient lines 5 and 6 in the reference position.

Figure 3:
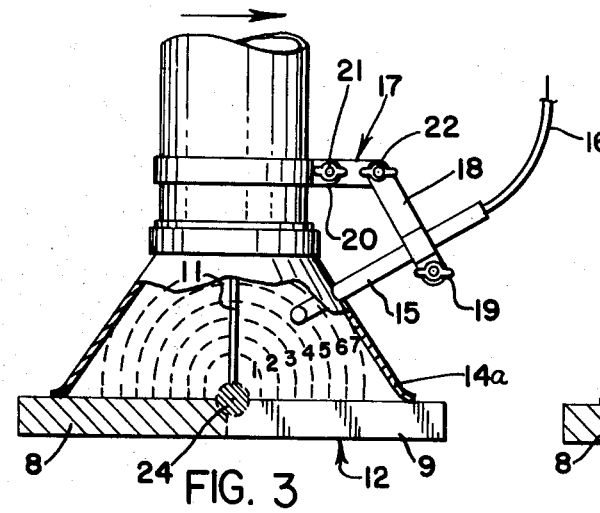
FIG. 3 is a side elevational view illustrating a condition where the welding arc is less than the proper depth of penetration into the workpiece.

Referring now to FIG. 3, it may be seen that the L of probe 15 is located substantially within the space between the potential gradient lines 4 and 5. It will be remembered that in FIG. 1, the reference position of the probe 15 was between the lines 5 and 6. Since the probe 15 in FIG. 2 is in a region of greater potential gradient, the result is that a voltage signal is developed in the probe which is greater than the voltage signal developed in the probe in FIG. 1. This signal is again conducted from probe 15 through cable 16 to signal amplifier 34 as shown in FIG. 5. The probe signal developed by the conditions shown in FIG. 2 is thus illustrative of what would happen if the welding arc is less than the proper depth of penetration into the workpiece. This is an unwanted situation because the weld metal 24 would be deposited on the top surface of the workpiece 12. The weld metal should be deposited between the pieces of metal 8 and 9. The invention obviates the condition shown in FIG. 3 from occurring by repositioning the arc 24 before the weld metal is deposited. This invention also precludes the situation shown in FIG. 4 from occurring.

Figure 4:
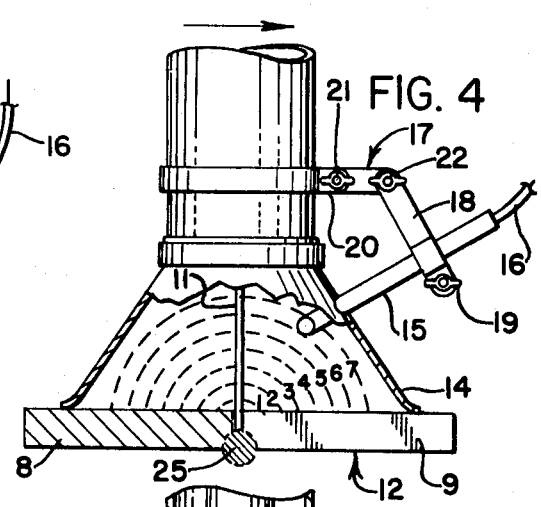
FIG. 4 is a side elevational view illustrating a condition where the welding arc is greater than the proper depth of penetration into the workpiece.

FIG. 4 shows the depth of penetration of the welding arc 25 being greater than the correct depth of penetration into the workpiece 12. The weld metal would be deposited nearer the bottom surface of the workpiece 12 than is desirable. Notice that for this depth of penetration the L of the probe 15 is substantially within the space between potential gradient lines 6 and 7. The resulting voltage signal developed in probe 15 is weaker than the probe signal in FIG. 1, which was the reference position for the probe. This weakened signal is conducted from the probe 15 to signal amplifier 34 as shown in FIG. 5. The position of the arc 25 is again corrected before the weld metal is deposited incorrectly or before the arc burns through the workpiece 12.

The schematic circuit diagram shown in FIG. 5 illustrates how the strength of the voltage signal in probe 15 controls the output voltage of welding generator 38 to control the penetration of the welding arc into the workpiece 12. The welding electrode 11 may be fed toward the workpiece 12 through the welding head 10 at a controlled rate by a conventional wire feeder 372 forcing the welding electrode downwardly at 30. Since wire arc penetration is determined by welding electrode diameter, rate of welding electrode feed, rate of welding head travel, and welding generator power output, any or all of these variables may be controlled by sensing the potential gradient in the arc envelope and transmitting this signal to the respective controllers 39, 37a and 50 through lines 40 and 41, 51 and 52. For purposes of analysis, I assume that the wire size is fixed and all controllers are operating at a fixed rate while the potential gradient probe 15 is controlling the generator power output. A suitable gas is chosen and supplied into the gas shield through tube 14b. The gas is confined to the region of the arc by skirt 14a.

The output voltage of the welding generator 38 is connected between the workpiece 12 and the welding electrode 11. The connection to the welding electrode 11 is through the welding head 10 and cable 37. The return path from the workpiece 12 is connected from point 35 through cable 36. The welding generator 38 has a separate field winding 39 which controls the output voltage of the welding generator 38 in accordance with the degree of excitation of its field winding 39.

An exciter 42 is connected to the signal amplifier and generator controller 34 by lines 43 and 44. Lines 40 and 41 connect the field winding 39 of the welding generator 38 to the signal amplifier and generator controller 34. The signal amplifier and generator controller 34 are also connected between the probe 15 and the workpiece 12. The exciter 42 produces an input to signal amplifier and generator controller 34 which is measured against and/or combined with the signal from the probe 15. The modified signal is transmitted to the field winding 39 of the generator 38. Cables 16 and 33 provide the conducting path from probe 15, and cable 32 to point 31 on workpiece 12 provides the return.

The principle of operation of the shielded arc-welding feedback control system of FIG. 5 is next considered. In order to calibrate the device, the welding generator output voltage is adjusted to a value sufficient to cause the correct depth of penetration of the arc 13 into workpiece 12 as shown in FIG. 1. This is facilitated by adjusting the exciter 42 and the generator controller 34 to provide the proper excitation to field winding 39. The probe 15 is then repositioned in the potential gradient in the arc envelope, and the signal amplifier 34 is adjusted to maintain the generator output voltage previously set in order to maintain the proper depth of arc penetration. The signal amplifier and generator controller circuitry may take the form of those circuits well known in the art which provide the sensitivity, stability and adjustability adequate for the system response desired. Solid state circuitry is a preferable choice for these components.

After calibrating the system to the reference position of the welding arc 13, the system will maintain this position of the welding arc 13 with respect to the workpiece 12 regardless of the variable conditions of the joint to be welded. If the variable conditions of the joint causes the penetration of the welding arc to be less than the reference setting as in FIG. 3, the probe 15 senses the higher potential gradient surrounding the arc and transmits the greater induced signal in probe 15 to the signal amplifier 34 through the cables 33 and 32. The output of the signal amplifier voltage is proportional to the increase in signal amplifier input voltage, and this causes the excitation of the field winding 39 of the generator 38 to be decreased. The lower field excitation causes the output voltage of generator 38 to drop a sufficient amount to allow a return to the reference depth of penetration of the arc.

If the penetration of the welding arc is greater than the reference setting as in FIG. 4, the probe 15 senses the lower potential gradient surrounding the arc and transmits the lower induced signal in the probe 15 to the signal amplifier 34 through the cable 33 and 32. The output voltage of the signal amplifier is proportional to the decrease in signal amplifier input voltage, and this causes the excitation of field winding 39 to be increased. The greater field excitation causes the output voltage of generator 38 to increase a sufficient amount to cause a return to the reference depth of penetration of the arc. The feedback voltage induced in probe 15 from the potential gradient surrounding the welding arc thus controls the penetration of the welding arc into the workpiece and the deposit of weld metal therein. A means for moving the welding head is generally indicated by 50 which can be any means well known in the art.

Figure 6:
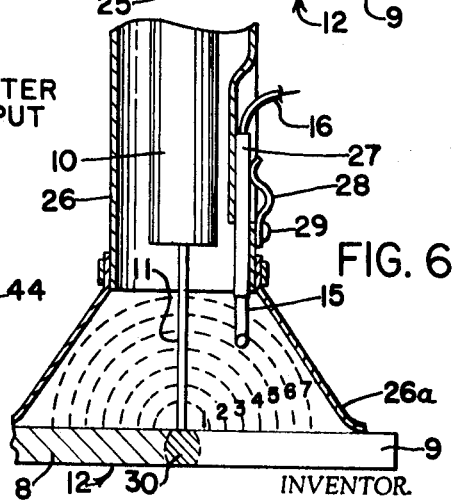
FIG. 6 is a side elevational view of an alternative embodiment, partly in section, illustrating the potential gradient probe fixed to the inner surface of the gas shield and spaced from the welding head.

A second embodiment of the mounting structure for the potential gradient probe 15 is illustrated in FIG. 6. The probe 15 is secured to an integral gas shield and clamp member 26 with a spring clamp 28 fixed to the integral gas shield and clamp 26 by a fastening pin 29. A high dielectric sleeve 27 is used to insulate probe 15 from the integral gas shield and clamp 26. As in the preferred embodiment, an asbestos skirt 26a extends between the integral unit 26 and the workpiece 12 in order to contain the flow of gases to the immediate vicinity of the welding arc 30. The embodiment of the invention shown in FIG. 5, using the alternate probe arrangement of FIG. 6, provides substantially the same system responsiveness as the preferred embodiment to correctly position the welding arc and weld metal with respect to the workpiece.

In both embodiments of this invention the probe 15 is located so that the ionized cloud forming the arc envelope is least disturbed by weld metal flow and weld splatter. It should also be recognized, however, that the probe 15 could be placed on either side of the workpiece 12 depending on the kind of welding being performed.

Since the ionized envelope exists in both an alternating current voltage arc as well as in a direct current voltage arc, the shielded arc-welding feedback control system disclosed herein is appropriate for both types of current generator systems. The probe 15 would remain substantially unchanged in both types of systems. Appropriate selection of the signal amplifier and generator controller would include consideration of frequency and damping characteristics needed for the generator system selected.

I claim:
1. In a shielded arc-welding feedback control system having an arc established between a welding electrode and workpiece, the improvement comprising:
   a welding head retaining said welding electrode;
   means for moving said welding head with respect to the workpiece;
   means for independently moving the welding electrode with respect to the workpiece;
   a gas shield surrounding said welding electrode and spaced from said welding head to form a nozzle for directing gas toward the welding arc, said gas shield including a skirt member for confining gas to the region surrounding the welding arc;
   means for developing a potential difference connected between the workpiece and said welding electrode;
   probe control means, including a probe spaced from said arc, for controlling said potential difference developing means, said probe control mean being responsive to the ion density in the arc envelope to deposit the weld metal at a predetermined depth in the workpiece.
2. The shielded arc-welding feedback control system of claim 1, wherein said probe control means includes:
   said probe for sensing the ion density in the arc envelope, the signal sensing end of said probe being within said skirt member and spaced from said welding electrode and the workpiece;
   means for amplifying the ion density signal sensed in the arc envelope;
   means for exciting said potential difference developing means, said exciting means being connected between said amplifying means and said potential difference developing means;

whereby said probe sense the ion density signal in the arc envelope and transmits a feedback signal to said amplifying means to control said exciting means for said potential difference developing means to position said welding electrode.

3. The shielded arc-welding feedback control system of claim 2, wherein said potential difference developing means is an electrical generator having a separate field winding, said exciting means is an electrical generator and an electrical generator controller and said exciting means is connected to said field winding of said electrical generator through said electrical generator controller.

4. The shielded arc-welding feedback control system of claim 3, wherein said welding head, said gas shield and said probe travel in unison with respect to the workpiece, said probe being electrically isolated from said welding head and said gas shield.

5. The shielded arc-welding feedback control system of claim 4, wherein said probe is mounted external to said gas shield at a predetermined angle with respect to the welding electrode, the sensing end of said probe projecting through said skirt member into the ionized gas region.

6. The shielded arc-welding feedback control system of claim 4, wherein said probe is mounted adjacent the inner surface of said gas shield, said probe having its longitudinal axis at a predetermined angle with respect to the longitudinal axis of said welding electrode.

7. The shield arc-welding feedback control system of claim 6, wherein the longitudinal axis of said probe is parallel to the longitudinal axis of said welding electrode.

8. In a shielded arc-welding feedback control system wherein an arc is established between a welding electrode and workpiece and comprising a welding head retaining said welding electrode;

means for moving said welding head with respect to the workpiece;

means for independently moving said welding electrode with respect to the workpiece;

a gas shield surrounding said welding electrode and spaced from said welding head to form a nozzle for directing gas toward the welding arc, said gas shield including a skirt member for confining gas to the region surrounding the welding arc;

means for developing a potential difference connected between the workpiece and said welding electrode;

means for controlling said potential difference developing means to deposit the weld metal at a predetermined depth with respect to the workpiece, wherein the improvement comprises;

said means for controlling including a probe spaced from said arc for sensing the ions in the arc envelope of said welding electrode, the sensing end of said probe being within said skirt member.

9. The shielded arc-welding feedback control system of claim 8, wherein said means for controlling controls the means for moving said welding head with respect to the workpiece.

10. The shielded arc-welding feedback control system of claim 9, wherein said means for controlling controls the means for independently moving said welding electrode with respect to the workpiece.